United States Patent
Choi

(10) Patent No.: US 7,573,848 B2
(45) Date of Patent: Aug. 11, 2009

(54) APPARATUS AND METHOD OF SWITCHING A VOICE CODEC OF MOBILE TERMINAL

(75) Inventor: Jin-Kyu Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 419 days.

(21) Appl. No.: 11/399,425

(22) Filed: Apr. 7, 2006

(65) Prior Publication Data

US 2006/0268937 A1    Nov. 30, 2006

(30) Foreign Application Priority Data

Apr. 7, 2005   (KR)   .................... 10-2005-0029139

(51) Int. Cl.
  *H04W 4/00*    (2006.01)
(52) U.S. Cl. .................. 370/329; 370/335; 455/428; 455/450
(58) Field of Classification Search ............. 370/329, 370/335; 455/428, 450
See application file for complete search history.

(56) References Cited

U.S. PATENT DOCUMENTS

| | | | | |
|---|---|---|---|---|
| 5,903,837 | A | * | 5/1999 | Wiedeman ............. 455/427 |
| 6,978,130 | B2 | * | 12/2005 | Nagata ................. 455/422.1 |
| 2003/0195006 | A1 | | 10/2003 | Choong et al. |
| 2003/0210659 | A1 | | 11/2003 | Chu et al. |
| 2004/0110539 | A1 | | 6/2004 | El-Maleh et al. |

FOREIGN PATENT DOCUMENTS

| | | |
|---|---|---|
| EP | 0 981 253 A2 | 2/2000 |
| GB | 2 352 127 A | 1/2001 |
| KR | 10-0250463 B1 | 4/2000 |

OTHER PUBLICATIONS

Warabino et al., IEEE Communications Magazine, "Video Transcoding Proxy for 3Gwireless Mobile Internet Access", vol. 38, No. 10, pp. 66-71, (Oct. 2000).
Siemens AG, "0oBTC corrections, supported codec mode configurations", 3GPP TSG CN WG4 Meeting #23, XX, XX, pp. 1-6, (May 10, 2004).

* cited by examiner

*Primary Examiner*—Nghi H Ly
(74) *Attorney, Agent, or Firm*—Birch, Stewart, Kolasch & Birch, LLP

(57) ABSTRACT

An apparatus and method for switching a voice codec of a mobile communication terminal are disclosed. The mobile communication terminal includes various types of voice codecs, and when the terminal requests a voice call between different types of communication systems, the communication network provides information on a type of the voice codec of a destination terminal to the terminal. Then, the terminal selects a voice codec corresponding to the information on the type of the voice codec of the destination terminal and transmits/receives voice data to/from the destination terminal through the selected voice codec. Thus, a transcoding process does not need to be performed on the voice data between the origination terminal and the destination terminal, and accordingly, voice quality can be enhanced, a delay of a voice transfer can be reduced, and a load of the communication network can be reduced.

15 Claims, 3 Drawing Sheets

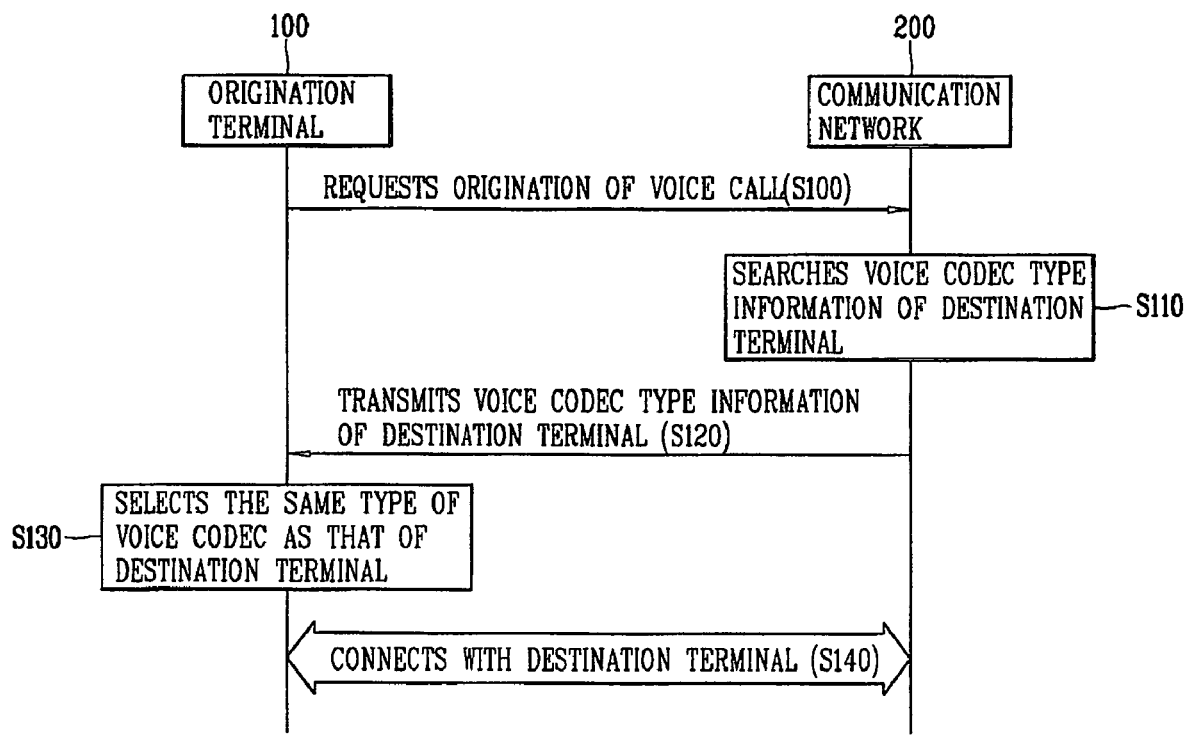

APPARATUS AND METHOD OF SWITCHING A VOICE CODEC OF MOBILE TERMINAL

BACKGROUND OF THE INVENTION

1. Field of the Invention

The present invention relates to an apparatus and method for switching a voice codec [e.g. speech codec] of a mobile terminal and, more particularly, to an apparatus and method for allowing an origination mobile terminal to select the same type voice codec as that of a destination mobile terminal and transmitting and receiving voice data through the selected voice codec to perform a voice call between different mobile communication systems.

2. Description of the Related Art

Currently, as mobile terminals are increasingly used, diverse supplementary functions can be performed by mobile terminals. In particular, the rapid advancement of a multimedia function of mobile terminals allows the mobile terminals to support reproducing of various formats of audio files.

Diverse voice codecs are currently provided and each codec is used in respective application fields according to its characteristics. A vocoder that determines basic call quality uses a different type voice codec for each mobile communication system, so in case of a voice call between different communication systems, a communication network must transcode a voice bit stream which has been encoded by a different codec so that vocoders of the different communication systems can exchange voice.

FIGS. 1A to 1C show the construction of a voice codec apparatus for a voice call of a general mobile communication system. Specifically, FIG. 1A shows the construction of a voice codec apparatus of general CDMA (Code Division Multiple Access) terminals, FIG. 1B shows the construction of a voice codec apparatus of general GSM (Global System for Mobile communication) terminals, and FIG. 1C shows the construction of a general voice codec apparatus for a voice call between different mobile communication systems.

With reference to FIG. 1A, a CDMA origination terminal 10 converts analog voice data into 64 kbps digital data through a PCM (Pulse Code Modulation), encodes the 64 kbps digital data into 8 kbps or 13 kbps data through a QCELP (Qualcomm Code Excited Linear Prediction) method (in case of PCS (Personal Communication System) or an EVRC (Enhanced Variable Rate Coder) method (in case of cellular system), and then transmits it. Then, a CDMA destination terminal decodes the 8 kbps or 13 kbps voice data according to the QCELP or the EVRC method, PCM-demodulates the decoded voice data and provides it to a user.

With reference to FIG. 1B, a GSM origination terminal 30 AMR (Adaptive Multi-rate)-encodes the PCM-demodulated voice digital data and transmits it. Upon receiving the AMR-encoded voice data, a GSM destination terminal 40 decodes the received voice data through the AMR, demodulates the decoded voice data through the PCM and then provides it to the user.

For example of a voice call between different mobile communication systems, as shown in FIG. 1C, in case of a voice call between the CDMA terminal of the CDMA system and the GSM terminal of the GSM system, since a voice codec of the CDMA system and that of the GSM system are different, a communication network performs a transcoding function to interface the voice codes of the two systems.

In other words, when the CDMA origination terminal 10 and the GSM destination terminal 40 performs a voice call, the CDMA origination terminal 10 encodes PCM-modulated voice data according to the QCELP or the EVRC method and then transmits it. Then, the communication network 50 decodes the voice data, which has been encoded according to the QCELP or the EVRC method, according to the QCELP or the EVRC method, encodes the decoded voice PCM data through the AMR, namely, the voice codec method of the GSM system, and then transfers it to the GSM destination terminal 40. Then, the GSM destination terminal 40 AMR-decodes the AMR-encoded voice data, demodulates the AMR-decoded voice data through the PCM, and provides the demodulated voice data to the user.

In the general voice call method between the different communication systems, when the communication network receives the voice data transmitted from the origination terminal, it decodes the received voice data by using the same voice codec as that of the origination terminal, encodes the voice data by using the same voice codec as that of the destination terminal, and then transmits it to the destination terminal. Accordingly, a load is applied to perform the transcoding of the communication network, the voice data can be damaged as it is decoded and encoded repeatedly on the channel, and a look-ahead delay for encoding is repeatedly generated.

BRIEF DESCRIPTION OF THE INVENTION

One aspect of the present invention involves the recognition by the present inventors of the drawbacks in the related art, as explained above. Based upon such recognition, improvements in encoding/decoding a voice used in the different types of communication systems can be achieved according to the present invention.

Certain features that may be part of the encoding/decoding method and system will not be described in much detail, merely to prevent the characteristics of the present invention from being obscured. However, such additional features may also be part of the encoding/decoding method and system of the present invention, as would be understood by those skilled in the art.

Therefore, an object of the present invention is to provide an apparatus and method for switching a voice codec of a mobile communication terminal whereby in providing a voice call service between different types of communication systems, when a call origination request is transmitted by an origination terminal including various types of voice codecs, information regarding a type of a voice codec of a destination terminal is transmitted from a communication network to the origination terminal so that the origination terminal can transmit voice data through the same type of voice codec as that of the voice codec of the destination terminal.

To achieve at least the above objects in whole or in parts, there is provided an apparatus for switching a voice codec of a mobile communication terminal in a voice call service between different types of communication systems, comprising: a controller for controlling selection of a voice codec of an origination terminal according to information on a type of a voice codec of a destination terminal; a switch unit for selecting one of a plurality of voice codecs under the control of the controller; and the plurality of voice codecs for encoding/decoding a voice used in the different types of communication systems.

To achieve at least these advantages in whole or in parts, there is further provided a method for switching a voice codec of a mobile communication terminal in a voice call service between different types of communication system, comprising: requesting origination of a voice call; receiving information on a type of a voice codec of a destination terminal; and selecting a voice codec corresponding to the type of the voice codec of the received information.

To achiever at least these advantages in whole or in parts, there in further provided a mobile terminal comprising: a transceiver to send and receive signals via a wireless communication network; a switch unit for selecting at least one of a plurality of voice codecs; and a processor cooperating with the transceiver, and the switch unit to perform, sending a request to obtain information on a type of a voice codec of a target terminal, the request being included within an outgoing signal to the wireless communication network; receiving the information of the voice codec type of the target terminal upon sending the request; selecting a same type of voice codec among the plurality of voice codecs that corresponds to the received information of the voice codec type; and initialing a call to the target terminal with operation of the selected voice codec.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 3 shows a method for switching a voice codec of a mobile communication terminal in accordance with another embodiment of the present invention.

DETAILED DESCRIPTION OF THE INVENTION

Preferred embodiments of the present invention will now be described with reference to the accompanying drawings.

Figure 1A:
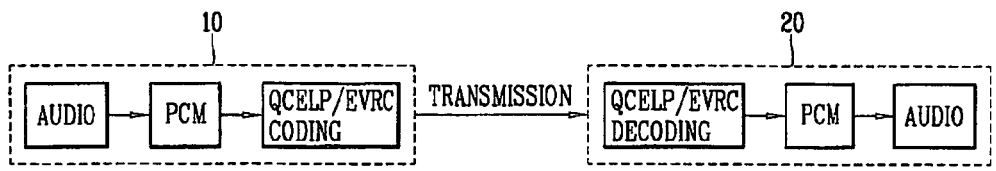
FIG. 1A shows the construction of a voice codec unit of general CDMA terminals.
Figure 1B:
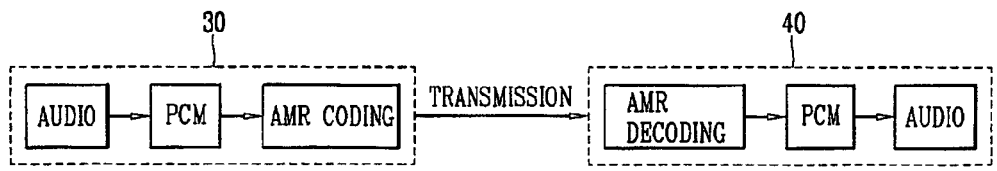
FIG. 1B shows the construction of a voice codec unit of general GSM terminals.
Figure 1C:
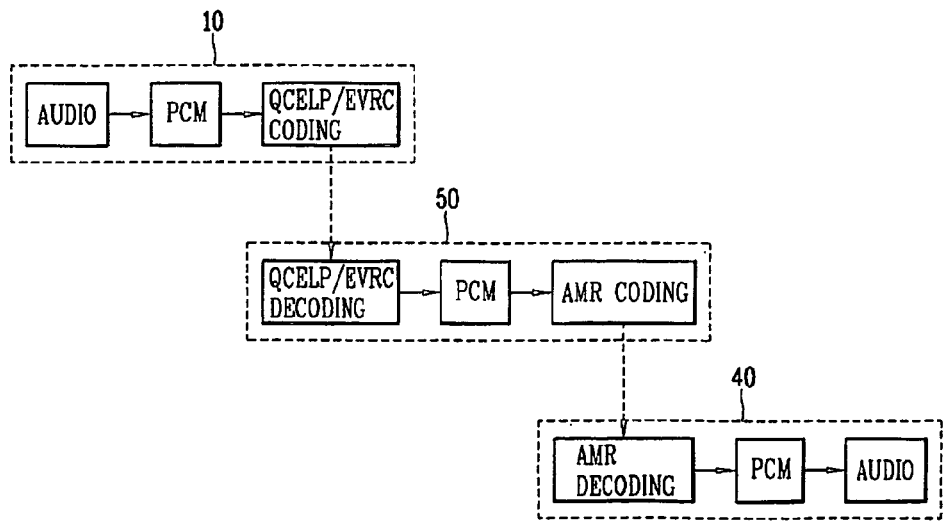
FIG. 1C shows the construction of a general voice codec unit for a voice call between different mobile communication systems.
Figure 2:
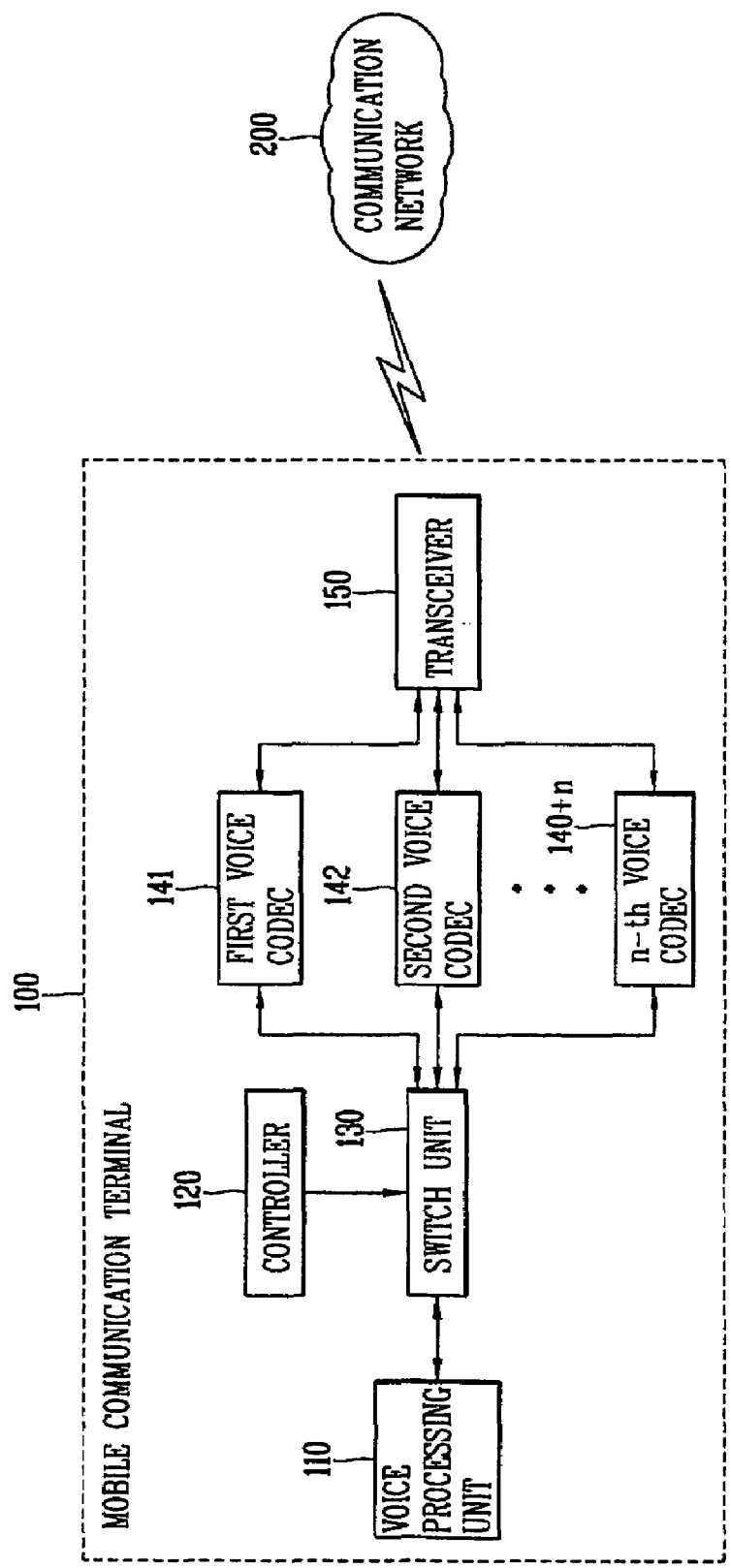
FIG. 2 shows the exemplary construction of an apparatus for switching a voice codec of a mobile communication terminal in accordance with one embodiment of the present invention.

FIG. 2 shows the construction of an apparatus for switching a voice codec of a mobile communication terminal in accordance with one embodiment of the present invention.

When a communication network 200 receives a request for origination of a call from a mobile communication terminal 100, it provides information on a type of a voice codec of a destination terminal. The mobile communication terminal 100 includes a voice codec switching apparatus for selecting a voice codec based on the information on the type of a voice codec of the destination terminal provided by the communication network 200 and transmitting voice data through the selected voice codec.

The voice codec switching apparatus of the mobile communication terminal 100 includes a voice processing unit 110 for PCM-converting voice data; a controller 120 for controlling switching of a voice codec according to the information of a type of the voice codec of the destination terminal provided by the mobile communication network 200; a switch unit 130 connected with the voice processing unit 110 and selecting one of a plurality of voice codecs under the control of the controller 120; a transceiver (transmitter/receiver) 150 for performing communication with the communication network 200; and a plurality of voice codecs 141~140+n connected between the switch unit 130 and the transceiver 150 and providing each different type voice encoding/decoding.

The plurality of voice codecs 141~140+n include voice codecs used in different types of mobile communication systems, such as, for example, a QCELP, an EVRC, an SMV (Selectable Mode Vocoder) (used for bettering sound quality and providing flexibility in an operation of a system by replacing the EVRC method), and an AMR, etc.

The operation of the voice codec switching apparatus of the mobile communication terminal constructed as described above will now be described.

FIG. 3 shows a method for switching a voice codec of a mobile communication terminal in accordance with another embodiment of the present invention.

First, the mobile terminal 100 transmits a call origination request to the communication network 200 (Step S100). Then, the communication network 200, for example, a base station, obtains information on the destination terminal included in the call origination request, searches the information on the type of the voice codec used by the destination terminal from a certain database, and provides corresponding results to the mobile communication terminal 100, namely, the origination terminal (steps S110 and S120). The voice codec type information can include a voice coded (e.g., QCELP, EVRC, SMV, AMR, etc.) or include a type of a communication system (e.g., a GSM system, a CDMA system, etc.) that can recognize the voice codec. The information on the type of the voice codec used by the destination terminal can be transmitted when a ring back tone is transmitted to the origination terminal from the base station.

When the origination mobile terminal receives the information on the type of the voice codec of the destination terminal, the controller 120 of the origination mobile terminal 100 determines the voice coded used by the destination terminal based on the information on the type of the voice codec of the destination terminal, and outputs a switching control signal to the switch unit 130 so that the same voice codec as the determined voice codec can be selected. The switch unit 130 selects the determined voice codec according to the switching control signal (step S130). Namely, if the voice codec used by the destination terminal is the AMR and the second voice codec 142 of the origination mobile terminal 100 encodes/decodes PCM voice data based on the AMR, the origination mobile terminal 100 selects the second voice codec 142.

Thereafter, when the call is connected with the destination terminal, the origination mobile terminal 100 encodes the PCM voice data through the second voice codec 142, and transmits it to the destination terminal through the transceiver 150 (step S140).

In this manner, the origination mobile terminal 100 selects the same type voice codec as that of the destination terminal belonging to the different communication system, encodes/decodes voice data through the selected voice codec, and performs voice call communication with the destination terminal.

As so far described, the apparatus and method for switching the voice codec of the mobile terminal in accordance with the present invention have many advantages.

That is, by managing the information (including information on the type of a communication system to which the terminals belong) on the type of the voice codec used by the terminals in a database according to each terminal by the communication network, when an origination call request is transmitted from the origination terminal to the destination terminal of a different communication system, the information on the type of the voice codec used by the destination terminal can be provided by the communication network.

Having various types voice codecs, when the origination terminal requests an origination call and the information on the type of the voice codec used by the destination terminal is provided to the origination terminal, the origination terminal selects the same type of voice codec as that of the destination terminal among various types of voice codecs and encodes/decodes the voice data through the selected voice codec. Therefore, it is not necessary to additionally perform decoding/encoding (transcoding) on the voice data as in the related art in the voice call communication between the different types of communication systems, so the voice quality can be enhanced, and since the look-ahead delay for encoding is reduced, the voice transfer delay time can be reduced.

In addition, when the origination terminal and the destination terminal, which belong to different communication systems, respectively, perform voice call communication with each other, the communication network does not need to perform the transcoding function to correct the difference between the voice codec of the origination terminal and that of the destination terminal, the load of the communication network can be reduced.

The term "terminal" is intended to refer to and cover various types of communication devices that support mobility (or may be fixed) and allows communication of information via wired and/or wireless interfaces.

Also, the present invention may be explained with reference to any types of audio codes in mobile terminals, these includes audio codes in a digital multimedia broadcasting (DMB) technology [i.e. satellite DMB, terrestrial DMB, digital video broadcast-handheld (DVB-H)], MP3 player and game, etc.

The present invention is described as being implemented in a GSM system and a CDMA system type of mobile communications system. However, the features of the present invention may also be adapted and implemented in communications systems operating under other types of communication specifications (e.g., 3GPP, 3GPP2, 4G, IEEE, OMA, etc.), because the concepts and teachings of the present invention could be applied to various communication schemes that operate in a similar manner based upon common techniques.

To implement the various features described above, the present invention can employ various types of hardware and/or software components (modules). For example, different hardware modules may contain various circuits and components necessary to perform the above method. Also, different software modules (executed by processors and/or other hardware) may contain various codes and protocols necessary to perform the present invention method.

Additionally, even though it would be too numerous to list all the features and variations that can be implemented in mobile communication terminals to accommodate and support the recent trend towards convergence of electronic and/or digital devices, those skilled in the art would easily understand that elements (i.e., hardware, software, or a combination thereof) that are equivalent to the function units and/or modules described above may be implemented in the mobile communication terminal 100 in accordance with the present invention.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. An apparatus for switching a voice codec of a mobile communication terminal in a voice call service between different types of communication systems, comprising:
   a plurality of voice codecs configured to encode/decode a voice used in the different types of communication systems;
   a switch unit configured to select one of the plurality of voice codecs; and
   a controller configured to receive a voice codec information of a destination terminal from a communication network and to control switching operation of the switch unit according to the received voice codec information,
   wherein the voice codec information includes a type of a voice codec used in the destination terminal or a type of a communication system to which the destination terminal belongs.

2. The apparatus of claim 1, further comprising:
   a voice processing unit configured to PCM-convert voice data and output the converted PCM voice data to the switch unit; and
   a transceiver connected with the plurality of voice codecs, the transceiver configured to transmit and receive encoded voice data.

3. The apparatus of claim 1, wherein the plurality of voice codecs include a QCELP (Qualcomm Code Excited Linear Prediction), an EVRC (Enhanced Variable Rate Coder), an SMV (Selectable Mode Vocoder) and an AMR (Adaptive Multi-Rate).

4. The apparatus of claim 1, wherein the communication network includes a base station.

5. The apparatus of claim 1, wherein when the communication network receives a request for voice call origination from the origination terminal, the communication network checks destination terminal information included in the voice call origination request and searches for the voice codec information of the destination terminal from a certain database by using the checked information on the destination terminal.

6. The apparatus of claim 1, wherein the voice codec information of the destination terminal is provided to the origination terminal before a voice call is connected between the origination terminal and the destination terminal.

7. The apparatus of claim 1, wherein the voice codec information of the destination terminal is transmitted when a ringback tone is transmitted to the origination terminal.

8. A method for switching a voice codec of a mobile communication terminal in a voice call service between different types of communication system, comprising:
   transmitting a call origination request to a communication network;
   receiving a voice codec information of a destination terminal from the communication network;
   determining a voice codec used by the destination terminal based on the received voice codec information of a destination terminal; and
   selecting a same type of voice codec as the determined voice codec from among a plurality of voice codecs, wherein the plurality of voice codecs are configured to encode/decode a voice used in the different types of communication systems.

9. The method of claim 8, further comprising:
encoding voice data through the selected voice codec and transmitting the encoded voice data from the mobile communication terminal (origination terminal) to the destination terminal, when a voice call is set up.

10. The method of claim 8, wherein the plurality of voice codecs include a QCELP (Qualcomm Code Excited Linear Prediction), an EVRC (Enhanced Variable Rate Coder), an SMV (Selectable Mode Vocoder) and an AMR (Adaptive Multi-Rate).

11. The method of claim 8, wherein the communication network includes a base station.

12. The method of claim 8, wherein when the request for the voice call origination is received, the communication network checks destination terminal information included in the voice call origination request and searches for the voice codec information of the destination terminal from a certain database by using the checked destination terminal information.

13. The method of claim 8, wherein the voice codec information of the destination terminal includes a voice codec used by the destination terminal or a type of a communication system to which the destination terminal belongs.

14. A mobile terminal, comprising:
a transceiver configured to send and receive signals via a wireless communication network;
a switch unit configured to select at least one of a plurality of voice codecs; and
a processor operatively connected to the transceiver and the switch unit, the processor configured to
send a request to obtain information on a type of a voice codec of a target terminal, the request being included within an outgoing signal to the wireless communication network;
receive the information of the voice codec type of the target terminal in response to the request;
select a same type of voice codec among the plurality of voice codecs that corresponds to the received information of the voice codec type; and
initialize a call to the target terminal with operation of the selected voice codec.

15. The mobile terminal of claim 14, wherein the outgoing signal is a voice call, a text message, or a multimedia message.

\* \* \* \* \*